Figure 7:
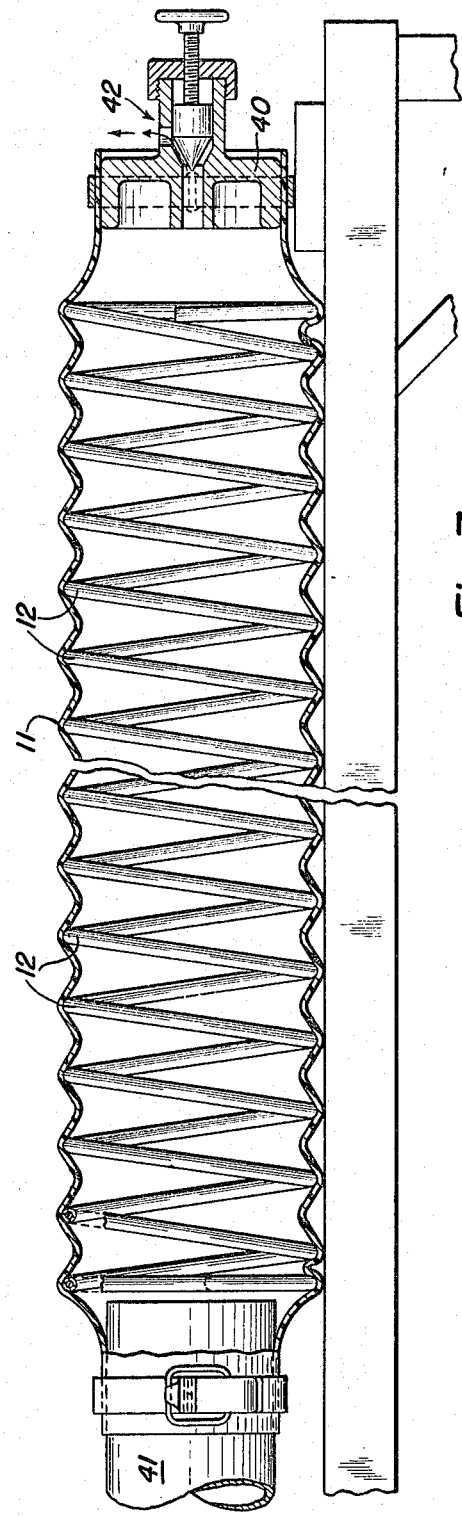

Dec. 6, 1966  J. E. DUFF  3,290,196
METHOD OF MAKING AN EXTENSIBLE REINFORCED HOSE
Original Filed Aug. 28, 1956  3 Sheets-Sheet 1
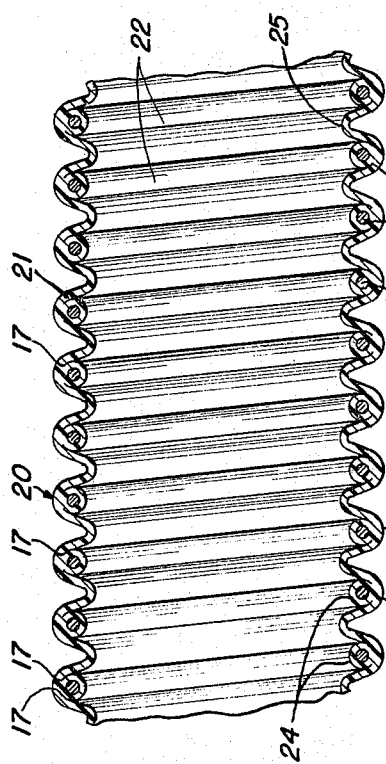
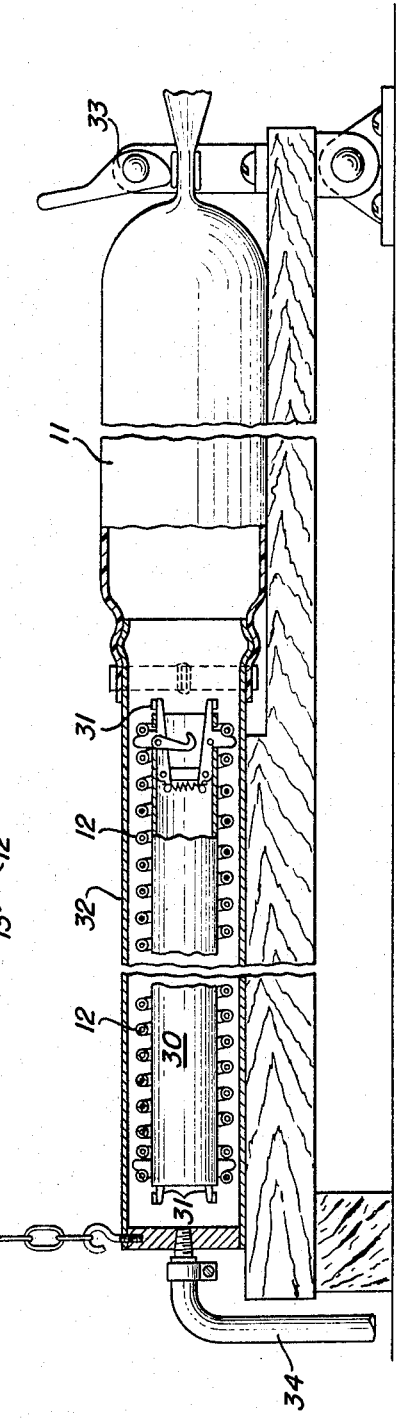

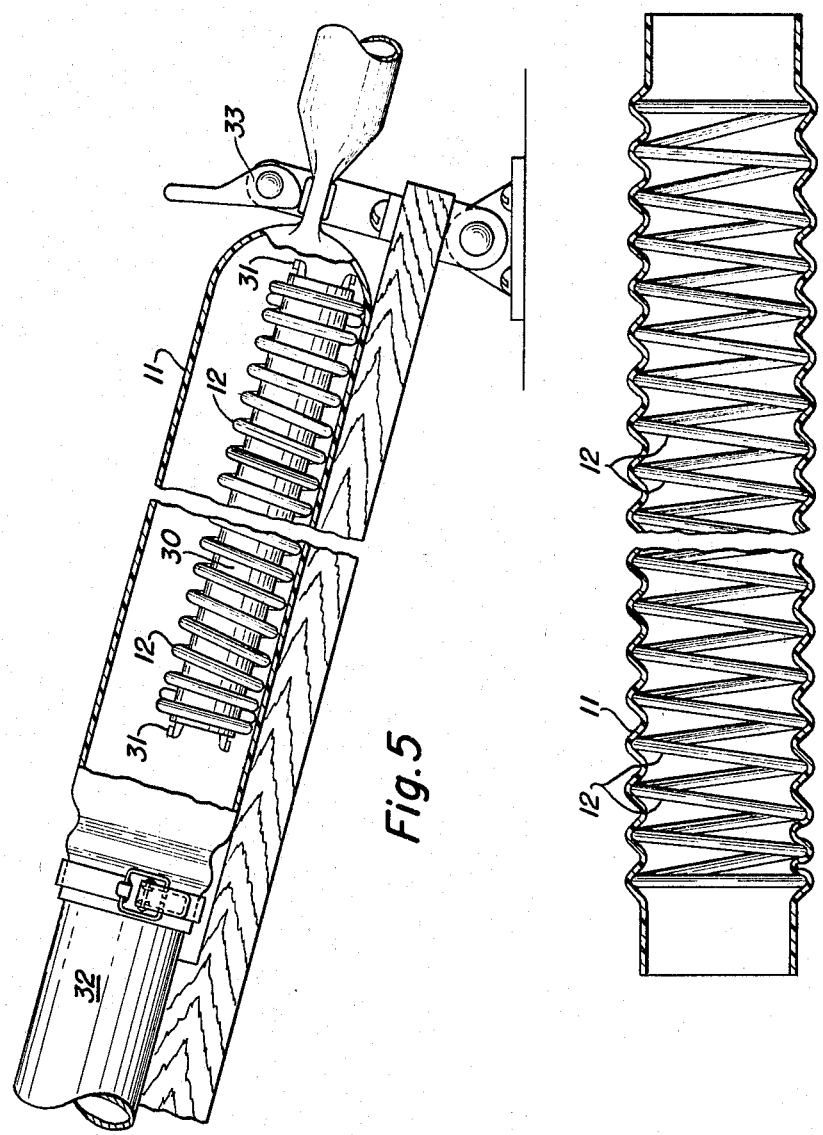

Dec. 6, 1966     J. E. DUFF     3,290,196
METHOD OF MAKING AN EXTENSIBLE REINFORCED HOSE
Original Filed Aug. 28, 1956     3 Sheets-Sheet 3

United States Patent Office 3,290,196
Patented Dec. 6, 1966

3,290,196
METHOD OF MAKING AN EXTENSIBLE
REINFORCED HOSE
Jack E. Duff, Canton, Ohio, assignor to The Hoover
Company, North Canton, Ohio, a corporation of Ohio
Original application Aug. 28, 1956, Ser. No. 606,606, now
Patent No. 3,080,891, dated Mar. 12, 1963. Divided
and this application Nov. 19, 1958, Ser. No. 774,922
14 Claims. (Cl. 156—144)

The present application is a division of my copending application, Serial No. 606,606, filed August 28, 1956, now Patent No. 3,080,891, in which the article is claimed while this application claims the method by which the hose of the parent application is made.

The present invention relates to flexible and extensible hose and to the method of making the same.

The hose made according to the present invention is flexible and both extensible and contractible lengthwise.

According to a preferred form of the present invention the hose is very extensible lengthwise but is not contractible lengthwise to any appreciable extent. According to another form of the invention the hose is both extensible and contractible lengthwise but is not as extensible as the preferred form.

The preferred form of the present invention is an improvement over my patent U.S. No. 2,739,616 dated March 22, 1956.

That patent discloses a hose which is very extensible lengthwise but is not contractible lengthwise to any appreciable extent. It is formed of a cylindrically coiled reinforcing element in the form of a metallic wire sheathed within a sheath of thermoplastic material surrounded by a corrugated tube of thermoplastic material in which the inner crests or troughs of the corrugations are in the form of deep folds of slack material which merely unfold when the hose is extended lengthwise.

In the hose of my prior patent the sheath of the reinforcing element may be bonded or unbonded to the inside of the outer crests of the corrugations. When it is unbonded and the hose is flexed too sharply especially across the end fittings, the turns of the coil may be displaced from one corrugation to an adjacent one with the result that the usefulness of the hose is impaired. When the coil sheath is bonded to the inside of the outer crests of the corrugations the lengthwise extensibility of the hose is lessened because by the method by which the hose is made the material of the tube wall becomes bonded to the sheath over substantially 180° or more of the circumference of the sheath. Thus when the hose is extended lengthwise the material forming the inner loops of slack material between the coil turns can only unfold up to the point where the sheath is bonded to the tube wall.

According to the present invention the turns of the coil are bonded to the inner wall of the outer crests of the corrugations over a very small arc in the order of 60° about the periphery of the coil turns. Thus it is assured that the coil turns will not be displaced from one corrugation to an adjacent one while at the same time the lengthwise extensibility of the hose is about the same as when the coil turns are unbonded. This comes about by reason of the fact that when the hose of my prior patent is fully extended the maximum that the deep folds of slack material can unwrap from the coil turns is up to a point where the tube wall is in contact with the periphery of the coil turns over an arc of approximately 60°.

According to the second form of the present invention the reinforcing element is not close coiled but is extended lengthwise when the tube of thermoplastic material is applied. When the spring is released the reinforcing element will contract lengthwise and assume a position intermediate its fully extended and full contracted positions.

With such a hose the corrugations are not as deep as in the preferred form when the hose is in its static released position. For that reason the coil turns are more easily displaced and it is necessary that the coil turns be bonded to the tube wall. In order that the extensibility of the hose be maintained at a maximum the bonded area extends over the periphery of the coil turns for about a 60° arc.

In both forms of the present invention a solvent for the thermoplastic material is evenly distributed on the interior of the carcass after the tube has been applied over the sheathed reinforcing element. The extra solvent is then poured out and the remaining excess permitted to evaporate. The solvent remaining will soften the material of the tube and of the sheath where they are in contact with each other.

The hose is then extended lengthwise to approximately the maximum extent possible in which position the tube wall will be in contact with the coil turns over an arc of approximately 60°. Heat is then applied, and the walls of the tube and sheath will be fused together over the 60° arc where they are in contact with each other.

In each case the hose is extended preferably by closing one end of the carcass with a valved plug and blowing a stream of warm air into the other end. During this operation the valve is so regulated that the pressure on the interior of the carcass will inflate the tube so as to extend it lengthwise as well as diametrically to a point where the tube is in contact with the coil turns over an arc of approximately 60°. The heated air will cause the solvent between the tube and coil to evaporate and fuse the two together over the surface where they are in contact.

It is within the purview of the present invention to mechanically extend the carcass lengthwise during the fusing operation and to apply the heat for fusing purposes by passing an electric current through the wire of the reinforcing element, to heat the wire inductively or to apply heat to the thermoplastic material by electrostatic heating.

Figure 8:
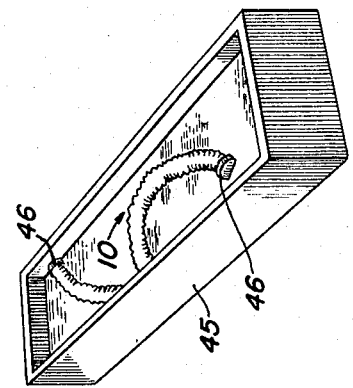

Other objects and advantages of the present invention will become apparent as the description proceeds when taken in connection with the accompanying drawings in which:

FIG. 1 is a longitudinal view of a section of the hose of the preferred form of the invention in its static contracted condition, FIG. 2 is a similar view of a section of the hose of the second form of the invention in its static contracted condition, FIG. 3 is an enlarged sectional view through one coil turn of the hose of FIG. 1 or 2 showing how the hose wall appears when the hose is extended to its maximum extent, FIG. 4 is a side view of an apparatus used in forming the hose of FIG. 1 or 2 and showing the reinforcing element in axially extended position and about to be inserted into the inflated tubing, FIG. 5 is a view of the apparatus of FIG. 4 showing the stretched reinforcing element on the interior of the inflated tube, FIG. 6 is a longitudinal sectional view of the hose of FIG. 1 or 2 after the tube is deflated and the carcass is removed from the apparatus of FIGS. 4 and 5, FIG. 7 is a view of the preferred form of the apparatus for extending the carcass and fusing the tube wall to the coil turns, and FIG. 8 is a view of an apparatus for curing the hose after the bonding operation.

Referring to FIG. 1 the preferred form of hose is generally represented by the reference numeral 10 and comprises a corrugated tube 11 of thermoplastic material and a cylindrically coiled spiral reinforcing element 12. The element 12 comprises a metallic wire 13 and a thermoplastic sheath or coating 14.

The coil turns are positioned within the outer crests 15 of the tube 11 and the inner crests or troughs form deep loose loops of slack material 16. When the hose is extended lengthwise the folds 16 unwrap from about the coil turns without stretching the material of the wall of the tube 11.

The hose of the modification of FIG. 2 is generally represented by the reference numeral 20 and comprises a tube 21 of thermoplastic material and a reinforcing element 22. As in the first modification the reinforcing element 22 is sheathed and comprises a metallic wire 23 in a sheath or coating 24 of thermoplastic material.

The hose 20 of FIG. 2 is somewhat extensible lengthwise and is also contractible lengthwise. When it is extended the inner crests or troughs 25 move outwardly somewhat and unwrap to some extent from about the coil turns which are positioned inside the outer crest 26 of the tube 20. When the hose 20 is axially contracted the inner crests move inwardly and if contracted sufficiently will eventually assume the position shown in FIG. 1 with the material of the outer crests wrapped about the coil turns. When released the hose 20 will return to its static position as shown in FIG. 2.

The fully extended position of each modification is shown in FIG. 3. The reference numerals of this figure are those in FIG. 1 but the corresponding reference numerals of FIG. 2 apply equally as well.

In each modification the tube 11 or 21 is bonded to the sheath 14 or 24 over an arc of approximately 60° as shown. In each case when the hose is axially extended to a maximum extent the wall of tube 11 or 21 will separate from the wall of element 12 or 22 up to the points 17 as shown in FIG. 3.

The wires 13 and 23 are preferably made of steel wire 0.058 inch in diameter and the sheaths 14 and 24 are preferably made of plasticized polyvinyl chloride 0.010 inch thick making the diameter of the reinforcing elements 12 and 22 approximately 0.078 inch. The tubes 11 and 21 are preferably made of elastomeric thermoplastic polyvinyl chloride 0.026 inch thick. The material of the sheath and tubes may have a tensile strength of 2,000 pounds per square inch at 80° F. The above dimensions may be varied widely for making hose having different characteristics.

In making the hose of FIGS. 1 and 2 the sheath 14 or 24 is first extruded about the wire 13 or 23 in a manner well known in the art. The sheaths 14 or 24 may also be in the form of coatings applied by dipping or spraying or any other manner known in the art.

In making the hose of FIG. 1 the sheathed reinforcing element 12 is close coiled so that its turns press against each other and when extended from that position they will return into contact with each other when free to do so. That operation may be performed by the apparatus disclosed and claimed in my copending application, Serial No. 495,159, filed March 18, 1955, now Patent No. 2,793,672 dated May 28, 1957.

In making the hose of FIG. 2 the turns of the reinforcing element 22 are spaced apart in their normal static position and the reinforcing element may be axially extended or contracted and will return to its normal static condition when free to do so.

The initial spacing of the coil turns depends upon the type of hose desired. If the desired hose is to be only slightly contractible and highly extensible the coil turns are wound so as to be fairly close in a normal static position. If the desired hose is to be highly contractible and less extensible the coil turns are wound so as to take a normal static condition in which the turns are more widely spaced.

FIGS. 4 to 8 inclusive will be described in connection with the making of the hose in FIG. 1 but is equally applicable to the making of the hose in FIG. 2.

The close coiled reinforcing element 12 is first stretched lengthwise and placed on the mandrel 30 and the end turns held by the clamps 31. It has been found that a reinforcing element 39 to 40 inches long can be stretched to a length slightly over 200 inches. One end of a length of tubing 11 of smaller diameter than the coil 12 and of a length sufficient to cover the stretched coil 12 when expanded is clamped to one end of a rigid pipe 32 of a diameter larger than the coil 12 and longer than the stretched coil and mandrel 30. The other end of the tube 11 is then clamped shut by any suitable means such as a clamp 33. Air under pressure is then applied to the interior of a pipe 32 by means of a conduit 34 leading to a source of air under pressure. As shown in FIG. 4 that causes the tube 11 to expand diametrically to a diameter larger than that of the stretched coil 12 and to expand longitudinally whereby the length of the tubing 11 will be longer than the stretched coil 12.

The pipe 32 is then tipped upwardly at an angle as shown in FIG. 5 with the result that the mandrel 30 with the stretched coil thereon slides into the expanded tube 11 as shown. The air pressure within the pipe 32 is then released and the tube 11 being of smaller diameter than the coil 12 will contract about the coil turns while the coil 12 is still stretched and the wall of the tube 11 forms shallow corrugations between the coil turns.

The clamp 33 is then released and the other end of the tube 11 unclamped from the pipe 32. The clamps 31 are then released to free the coil 12 for movement towards its contracted position. The coil turns will move toward each other as much as permitted by the wall of the tube 11 and assume the position shown in FIG. 6. During the contraction of the coil 12 the walls of the tube 11 will move inwardly between the coil turns to form deeper corrugations as shown. At this point the walls of the tube 11 are under a compressive force by the action of the spring tending to make the corrugations deeper i.e. the bands of material forming the inner crests or troughs of the corrugations are under a stress tending to reduce their circumference and diameter.

The next step is to apply a solvent to the interior of the carcass of FIG. 6. This may be done by plugging one end of the carcass, pouring the requisite quantity of solvent into its interior, plugging the other end of the carcass and shaking or moving the carcass about until all areas of its interior have been wetted with solvent. The solvent may be of any kind which will soften the material of the tube 11 and sheath 14. One such solvent is a 50–50 mixture of toluene and methyl ethyl ketone.

The excess solvent in liquid form is then poured out of the carcass and the carcass manipulated until the remaining excess solvent has evaporated.

A plug 40 (FIG. 7) may then be secured to one end of the carcass of FIG. 6 and the other end clamped about a tube 41 which may be connected to the exhaust of a suction cleaner or to any other source of warm air under pressure. The plug 40 is provided with the valve 42 by which the flow of air therethrough may be regulated to control the pressure within the interior of the carcass.

The suction cleaner is then set into operation to pump warm exhaust air through the conduit 41 and into the interior of the carcass, which will cause the carcass including the coil 12 to expand axially. It will also cause the tube 11 to expand circumferentially as shown in FIG. 7. The valve 42 is regulated so that the wall of the tube 11 is expanded to such an extent as to have contact with the coil turns over an arc of approximately 60° as shown.

This operation is continued until the heat from the warm air flowing through the carcass has evaporated the solvent between the tube 11 and sheath 12 and fused the wall of the tube 11 to the sheath 12 over the 60° arc as shown in FIG. 3. The time will vary depending upon the conditions but can be determined experimentally for any particular set of conditions.

After the fusing operation the air pressure is released and the carcass will reassume the position shown in FIG. 6 except that the tube 11 will be fused with sheath 12 over the 60° arc as shown in FIG. 3. At this time the wall of the tube 11 will still be under stresses tending to contract it since the heat applied to it during the fusing operation is not sufficient to soften the vinyl tube 11 to a point where it will collapse axially under the force applied by the spring.

The carcass is then placed in the water in tank 45 which is maintained at a temperature of from 165 to 180° F. by a thermostatically controlled electric heater (not shown). Plugs 46 may be used if desired to close the ends of the carcass to prevent water from entering the interior thereof during this operation. The heat thus applied softens the walls of the tube 11 to permit the spring to contract as far as possible which is to the position shown in FIG. 1. During this action the inner crests or troughs 16 of slack material will be formed by the compressive action on the coil on the soft material which forms the crests or troughs 16.

The carcass is left in the tank 45 for a few seconds and then removed. It may be permitted to cool to room temperature naturally or it may be artificially cooled whereby the tube will take permanent set, in the position shown in FIG. 1.

The hose thus formed will assure that the coil turns will not be displaced from the interior of the outer crests 15 when the hose is sharply flexed or extended and at the same time will retain the extensibility of the hose to the same extent as when there is no bonding.

The hose of FIG. 2 is made in substantially the same manner except that the length of the tubing per coil turn will be greater since the coil turns are initially spaced apart to some extent. Thus the mandrel 30 would be shorter in making a finished hose in FIG. 2 having the same finished length as the hose in FIG. 1 because such a hose will not contract as much as the hose of FIG. 1. The less extensible the finished hose is the shorter the mandrel that is necessary. It is possible to make a hose which is not extensible at all by not stretching the spring when the tube is applied, in which case, the mandrel will be of the same length as the finished hose.

In any event the length of the hose 21 is so chosen that, when inflated it will extend over the entire coiled length of spring on the mandrel 30.

Under such circumstances when the carcass is removed from the mandrel 30, the carcass will assume a position similar to that of FIG. 6 except that the corrugations may not be as deep, their depth depending upon how far the coil is stretched when the tube is applied to the mandrel. In case of a completely non-extensible hose the corrugation depth would depend solely upon the relative inside diameter of the coil and tube.

When a carcass for producing the hose of FIG. 2 is placed in the tank 45 the coil 22 will draw back until it assumes its normal static condition as shown in FIG. 2 and that condition will depend upon the stretch given to the coil when the tube is applied.

The finished hose of FIG. 2 while not as extensible as that of FIG. 1 is useful for many purposes for example where hose of variable length are necessary and where it is necessary that the hose be contracted while in use or for storage purposes.

The bonding of the tube to the sheath of the coil only over a small arc at the outer crests of the corrugations insures that the coil turns will not be displaced and increases the flexibility and extensibility of such hose over that of hose having a greater area of bonding or where the coil is embedded in the wall of the hose.

While I have shown and described but two embodiments of my invention it is to be understood that those embodiments are to be taken as illustrative only and not in a limiting sense. I do not wish to be limited to the specific structures and methods shown and described but wish to include all equivalent variations thereof except as limited by the scope of the claims.

I claim:

1. The method of forming a hose comprising, coiling a reinforcing element into a cylindrical spiral coil, applying a tube of thermoplastic material of smaller diameter than said coil over said coil to form a corrugated carcass and bonding the corrugations of the wall of said tube to the outer periphery of the turns of said coil over an arc substantially less than 180° of the circumference of said element.

2. The method according to claim 1 in which said carcass is extended lengthwise to separate the corrugated wall of said tube from about the circumference of said element except for an arc of substantially less than 180° and bonding the wall of said tube to the turns of said coil where they are in contact with each other while said carcass is extended.

3. The method according to claim 1 in which said bonding step is performed by applying heat to said carcass.

4. The method according to claim 1 in which the outer surface of said reinforcing element is of thermoplastic material and said bonding step includes the application of a solvent for the thermoplastic material of said tube and element and the application of heat to said carcass to fuse the material of said tube and element together.

5. The method according to claim 1 in which said tube is applied over said coil while the latter is extended lengthwise to space the coil turns thereof and then released to cause the wall of said tube to move inwardly between said coil turns to form said corrugations.

6. The method of forming an extensible hose comprising, coiling a sheathed reinforcing element into a cylindrical spiral coil, stretching said coil to separate the turns thereof beyond their normal static position, applying a tube of thermoplastic material of smaller diameter than said coil over said coil and allowing said coil to contract, axially extending the assembly thus formed until the wall of said tube is in contact with the turns of said coil over approximately 60° of the circumference of said element and bonding said tube to the turns of said coil over the area where they are in contact with each other.

7. The method according to claim 6 in which said extending step comprises inflating said assembly to such an extent that the wall of said tube is in contact with the turns of said coil over approximately 60° of the circumference of said element.

8. The method according to claim 7 in which the air for inflating said assembly is warm so as to facilitate the bonding operation.

9. The method according to claim 8 in which a solvent for said tube and the sheath for said reinforcing element is applied to the interior of said assembly prior to its inflation.

10. The method of forming an extensible hose from a close coiled cylindrical spirally coiled reinforcing coil, in the form of a metallic wire sheathed within a sheath of thermoplastic material and a tube of thermoplastic material of smaller diameter than that of the turns of said coil comprising, assembling said tube over said coil while the latter is axially extended to separate the turns thereof, applying a solvent for said thermoplastic material to the interior of the assembly thus formed, stretching the assembly so that the wall of said tube is in contact with the periphery of the turns of said coil over substantially less than 180° of the periphery of said sheath and applying heat to the tube wall and sheath to vaporize said solvent and fuse the tube wall to the turns of said coil over the area in which they are in contact with each other.

11. The method according to claim 10 in which the turns of said coil tend to return into contact with each other when free to do so and the turns of said coil are released after the fusing step to permit the turns of said coil to move toward each other as far as permitted by the wall of said tube and treating the assembly to relax the stresses in the tube wall to permit said coil to further contract and form deep inwardly extending folds of slack material in the tube wall between the turns of said coil.

12. The method according to claim 10 in which said stretching and heat applying steps are carried out by inflating said assembly with warm air from a source of warm air under pressure.

13. The method according to claim 12 in which air is bled from said assembly at a rate to apply a pressure on the interior of said assembly to hold the wall of said tube out of contact with the periphery of the sheath of said coil except for an arc of approximately 60° of the outer crests of the turns of said coil.

14. The method of forming a hose comprising, coiling a reinforcing element into a cylindrical spiral coil, applying a tube of thermoplastic material over said coil to form a corrugated carcass and bonding the corrugations of the wall of said tube to the outer periphery of the turns of said coil over an arc substantially less than the transverse circumference of said reinforcing element, the inner surface of said tube which embraces said reinforcing element being bonded thereto over a portion only of the embraced area at the crests of said corrugations along the transverse periphery of said reinforcing element with the remaining area of said surface embraced by said tube being left unbonded.

References Cited by the Examiner

UNITED STATES PATENTS

| | | | |
|---|---|---|---|
| 2,641,302 | 6/1953 | Martin | 138—56 X |
| 2,783,819 | 3/1957 | Duff | 154—8 X |
| 2,797,730 | 7/1957 | Martin | 154—8 X |
| 2,858,854 | 11/1958 | Daggett | 154—8 X |
| 2,949,133 | 8/1960 | Rothermel | 138—56 |

EARL M. BERGERT, *Primary Examiner.*

RUBEN LEIBOWITZ, CARL F. KRAFT, JOSEPH REBOLD, *Examiners.*

D. J. DRUMMOND, *Assistant Examiner.*